(12) United States Patent
Kanevsky et al.

(10) Patent No.: US 6,285,777 B2
(45) Date of Patent: *Sep. 4, 2001

(54) INTERNET ASSISTED MAIL

(75) Inventors: Dimitri Kanevsky, Ossining, NY (US);
Stephane H. Maes, Danbury, CT (US);
Wlodek Wlodzimierz Zadrozny, Tarrytown, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/978,957

(22) Filed: Nov. 26, 1997

(51) Int. Cl.[7] .............................. G06K 9/00; G06K 9/34; H04N 1/00; H04N 1/40
(52) U.S. Cl. ...................... 382/101; 382/176; 358/402; 358/462
(58) Field of Search .................................... 382/101, 176, 382/321; 395/200.36; 707/513; 358/402, 462

(56) References Cited

U.S. PATENT DOCUMENTS

| | | | |
|---|---|---|---|
| 4,837,798 | * 6/1989 | Cohen et al. | 379/88.14 |
| 5,031,223 | * 7/1991 | Rosenbaum et al. | 382/101 |
| 5,245,532 | * 9/1993 | Mourier | 364/400 |
| 5,422,733 | * 6/1995 | Merchant et al. | 358/407 |
| 5,424,724 | * 6/1995 | Williams et al. | 340/825.05 |
| 5,503,332 | * 4/1996 | Glenn | 239/56 |
| 5,617,481 | * 4/1997 | Nakamura | 382/101 |
| 5,648,916 | * 7/1997 | Manduley | 364/400 |
| 5,696,842 | * 12/1997 | Shirasawa et al. | 382/176 |
| 5,737,437 | * 4/1998 | Nakao et al. | 382/101 |
| 5,754,671 | * 5/1998 | Higgins et al. | 382/101 |
| 5,805,810 | * 9/1998 | Maxwell | 395/200.36 |
| 5,903,723 | * 5/1999 | Beck et al. | 395/200.3 |

OTHER PUBLICATIONS

Patel et al, "The Multimedia fax–MIME Gateway"; IEEE Multimedia paper, ISSN: 1070–986X, vol. 1, Issue 4, pp. 64–70, Jan. 1994.*

* cited by examiner

Primary Examiner—Amelia M. Au
Assistant Examiner—Mehrdad Dastouri
(74) Attorney, Agent, or Firm—Louis J. Percello, Esq.; Perman & Green, LLP

(57) ABSTRACT

A communication system that transmits and receives combinations of paper mail and electronic mail. The communication system permits a user of the system to send an internet message via post mail including the mailing address for delivery. The post mail office forwards the internet message via e-mail to the internet post office that is the closest to the addressee. This post office that is local to the addressee downloads this message, prints a hard copy on a paper, encloses it in an envelop and sends the hard copy to the addressee via usual local mail. The communication system also permits a user of the system to send paper mail to the post office. The post office scans the paper mail and forwards the scanned information data either to the addressee directly via internet or via a post office that is local to the addressee.

5 Claims, 5 Drawing Sheets

| | |
|---|---|
| 121 — SEND VIA INTERNET | YES<br>NO |
| 122 — SEND VIA POST MAIL | YES<br>NO |
| 123 — DESTINATION INTERNET ADDRESS | SMITH @ RESCTR |
| 124 — DESTINATION POST ADDRESS | JOHN SMITH<br>STREET, CITY |
| 125 — OPEN ENVELOPE TO SCAN LETTER | YES<br>NO |
| 126 — SENDER'S INTERNET ADDRESS | JONES @ WESTCH |
| 127 — SENDER'S POST MAIL ADDRESS | JAMES JONES<br>STREET, CITY |

FIG.5

INTERNET ASSISTED MAIL

BACKGROUND OF THE INVENTION:

1. Field of the Invention

The present invention relates generally to improved mail communications and more particularly to techniques that combine surface mail delivery and an internet link

2. Background Art

There are several problems that exist in present paper mail handling system. The problems include the expensive manpower needed for distribution of paper mail at sorting/delivering locations the handle handwritten/typed mail addresses. Existing automatic means for identification of the addresses (e.g. automatic handwriting recognition) are unsatisfactory. Another problem is that the delivering of paper mail letters can be relatively slow, especially if letters are sent to remote places. The volume of paper mail undergoes several peaks at different times of the year such as at holidays. During those peaks the above-mentioned problems become especially acute. On the other hand, internet users enjoy a fast and easy access and communication to other internet users. However, this internet interaction suffers from the deficiency that the internet user cannot deliver/receive internet messages from people who have no internet facilities.

SUMMARY OF THE INVENTION

An object of the present invention is to provide a new system and service for speeding up surface mail communication, by replacing and adding an internet link to the normal delivery.

Another object of the present invention is to provide a communication system wherein a user sends an internet message to a post office including the post mail address for delivery of the message. The post office forwards the internet message via e-mail to the internet equipped post office that is the closest to the addressee. This post office that is closed to the addressee downloads the internet message, prints a hard copy on a paper, encloses it in an envelope and delivers the hard copy to the addressee via usual local mail.

A further object of the present invention is to provide a communication system wherein a user sends paper mail to an internet equipped post office. The post office electonically scans the paper mail and forwards the scanned information data either to the addressee directly via the internet or via an internet equipped post office that is local to the addressee.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

BRIEF DESCRIPTION OF THE DRAWINGS

FIG. 5 is an illustration of an example of representation of information on an envelope relating to how and where a letter should be sent

DETAILED DESCRIPTION OF THE PREFERRED EMBODIMENTS

A growing but still relatively small proportion of postal customers has internet access. The customers could receivers or send their mail via internet but not all receivers have access to the internet Combining surface mail communication with internet facilities can provide internet users with improved postal service as described in FIG. 1.

Figure 1:
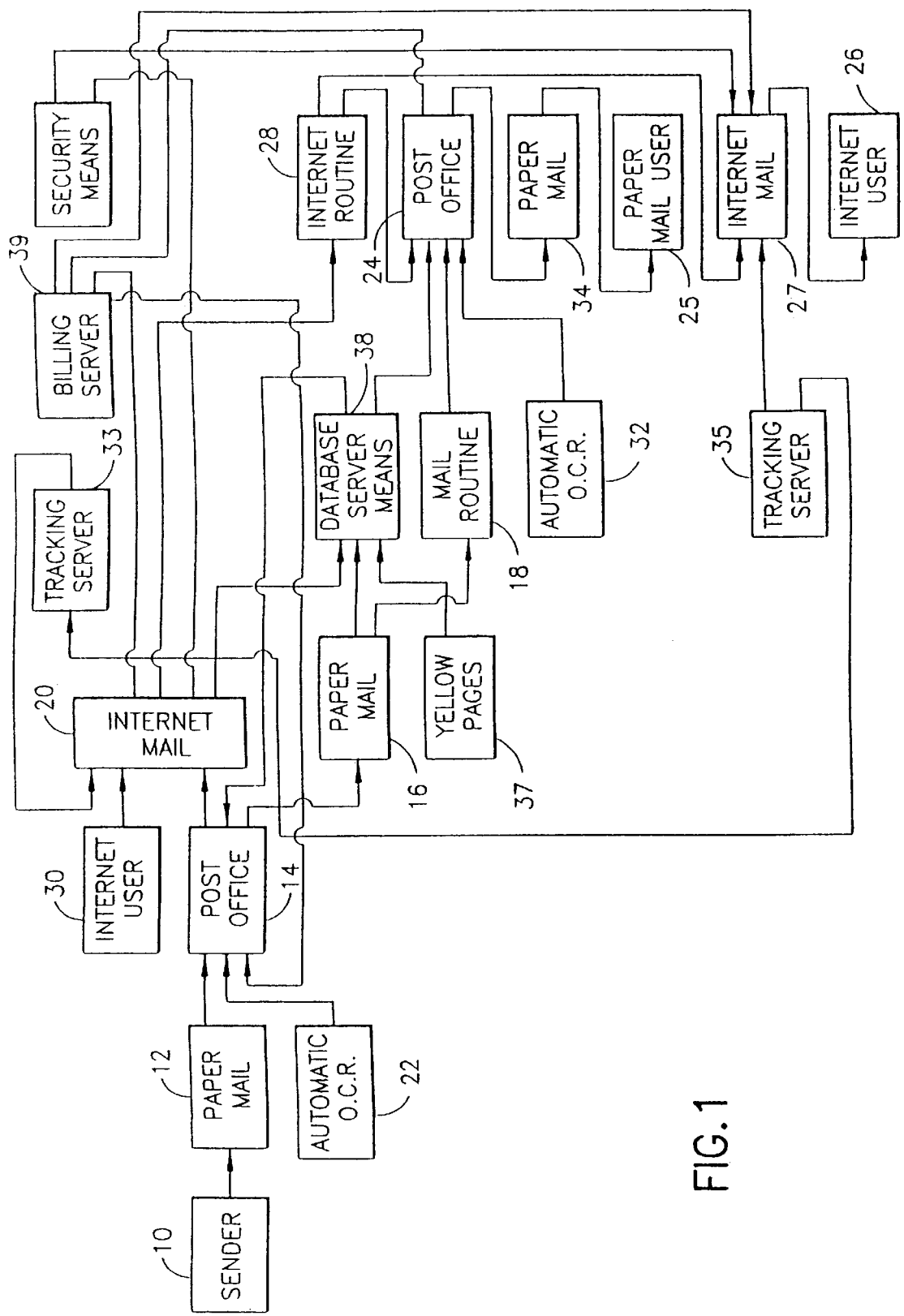
FIG. 1 is a schematic block diagram illustrating an embodiment of a mail/internet connection.
Figure 2:
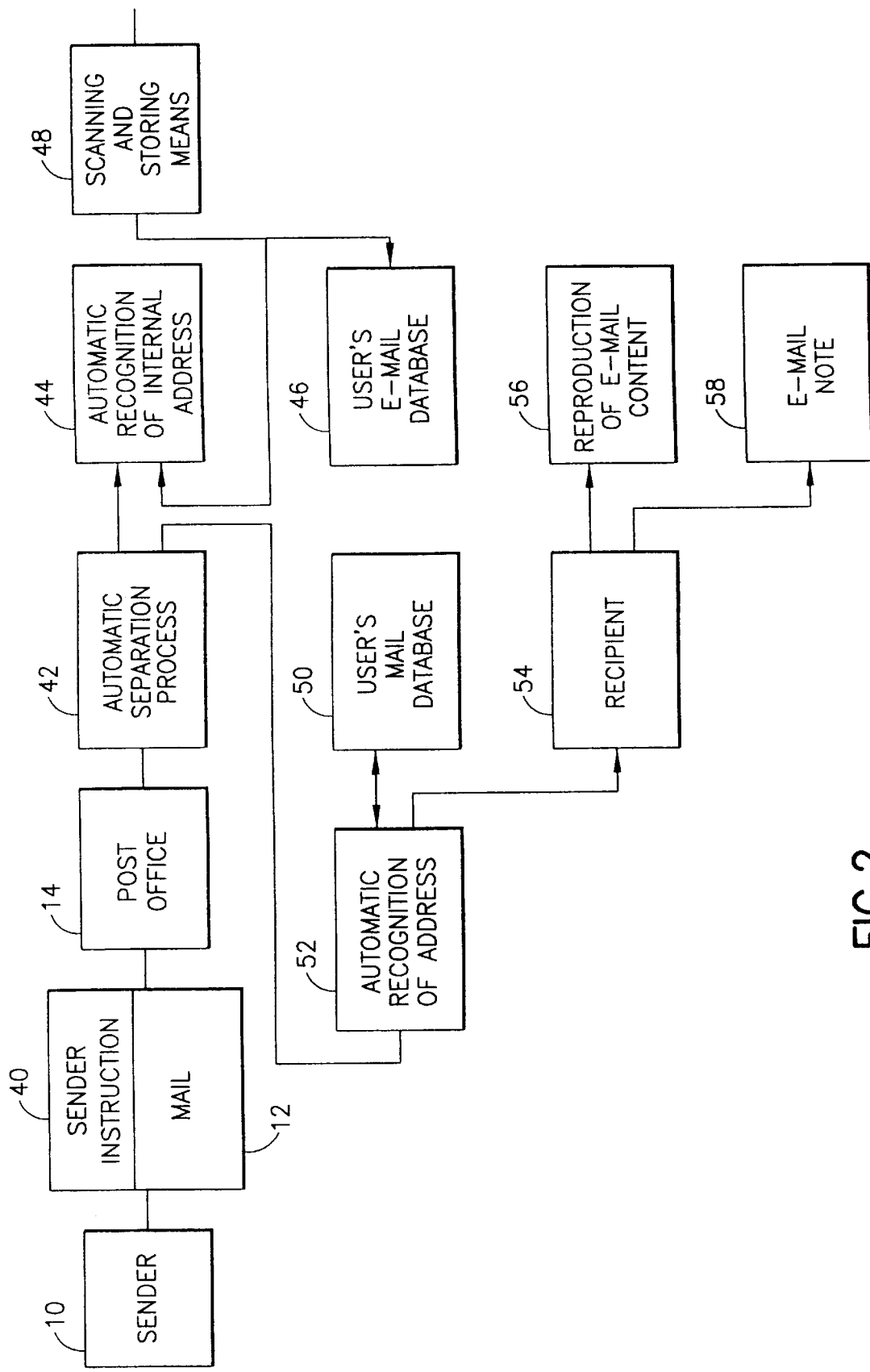
FIG. 2 is a schematic diagram illustrating an embodiment of a system for communication from a sender of mail to an internet user.

In FIG. 1 a block 10 represents a sender of a paper mail item 12 to a post office 14. In the post office 14 incoming mail is separated in two parts—those such as paper mail that will be sent as a surface mail 16 via usual post routines 18 and those provided by an internet user 30 that will be sent as internet mail 20. This separation process uses automatic character recognition facilities 22 and is described in detail in FIG. 2. The paper 12 mail that is processed via usual paper routines 18 get to another post office 24 and then the paper mail 34 reaches its use at a destination point 25. Automatic character recognition facilities 32 at this local post office 24 (automatic handwriting recognition (OCR) can be used to identify a destination address that is represented on the item of mail 12. The technique for of sending mail by the internet is represented by the internet routine means 28. The mail that was chosen to be sent via internet routine 28 is transformed to e-mail information. This transformation process is done in post office 14 and described in FIG. 2. The e-mail data is either transmitted directly to an internet user (if he has internet address) as internet mail 20 or it is sent to a post office 24 that is local to a destination user. There it is transformed back to paper mail 34, as is described in FIG. 1, and then sent to the destination of the paper mail user 25.

Thus, in the method and system shown in FIG. 1, the e-mail information at a local internet/post server (near a destination user) can be split, part of it can be sent to a user as a e-mail note (textual note), part of it (graphics) can be converted to a paper mail and sent via surface mail local routine. Information about senders/receivers (their e-mail/post addresses) is stored in the database of database server means 38. This information is used to improve the handwriting recognition/OCR of addresses by matching decoded addresses with addresses stored in the database and correcting incorrectly recognize characters/numbers in a decoded output The envelope of the paper mail contains information and instructions from a sender as to how it should be delivered at a destination point (as an e-mail or as a paper mail) or what parts of it should be delivered as an e-mail note or as a paper mail. A typical e-mail header example is as follows:

Stephane Seam__751__25__shelter__rock__road__danbury__CI09990__USA@postoffice-server.go An e-mail header can also contain information on how the paper mail should be reproduced (paper format, size, cursive/ASCII style, kind of smell-perfumery etc.) An encryption means can also be provided to perform an encryption and decryption of the content of e-mail message such that content that is not in a header is preserved while it is processed at Internet/post-mail servers. A user server database (either central or local to post office) should contain information examples of sender handwriting styles in order that a sender's handwriting style could be synthesized. FIG. 1 also includes means 39 for providing a billing procedure. The billing procedure can be carried out in several ways. To send e-mail's a user could be required to enroll and to pay a monthly fee, independent of mailing, or to pay per mail sent (or kB sent) or to pay a fixed price for a given amount then on a mail by mail basis. Special orders (color pictures etc.) may be paid either by the sender or receiver. The billing server 39 should be connected to Internet mail facilities and to banks to allow electronic payment (via electronic payment means that include also security protection from fraud). There are means that allow data from a general user database to find post-mail address of a destination point using only e-mail address of destination person. And, conversely, using postmail address of a destination person to find an e-mail address of a destination person if the address exists. This database can include e-mail/post addresses of users that already signed for this Internet/mail service. This database can be connected to other databases with e-mail/post addresses and telephones (e.,g. yellow pages means 37) The method and system of FIG. 1 also includes means to provide a way for somebody to send an e-mail to a user without e-mail address based on the address of the person. In such a case the person must send the e-mail to a server and the server must be able to automatically convert country, zip code, and city into the e-mail address of the closest post office. The local post office should now be able to read the rest of the header to check if the corresponding address is associated with a registered e-mail in which case the mail is forwarded, or not. If the address is not associated with a registered e-mail it is printed and mailed. (Of course, the sender can also request that it be printed). When sending a mail to be sent by the post office via e-mail to somebody, it is also important to have the appropriate return address. In other words, the recipient must know that to reply via e-mail he must send: the originating post office e-mail address to the local post office where it is specified if pictures are to be printed etc. Digitization of paper mail to electronic mail should include the option of snapshot of pages (such as by fax). Means to perform the following functions are also provided in FIG. 1. The capability to track the mail is provided by tracking servers 33 and 35. The possibility to have notification of receipt and authentication of sender/receiver (including, whether it has been delivered, whether it has been read), whether it is required to download registered documents via a secure web server (or notes server) or from a mail server with a special password.

The system and method of FIG. 1 further includes means to inform to post office when there are pictures and documents, how to indicate what documents to print at post office, what to e-mail. Or what to print as regular text and what to print as high quality pictures. This can be done with a special attachment to an envelope or an electronic form for the e-mail note on which additional user instructions can be written. Also a post office can store information from receivers on their preferences and what computer facilities are available at the home/offices.

For example a user can indicate to the post office that he has no graphic utilities at his computer. Therefore each time a post office obtains an electronic package with graphics—it will print graphics and send only textual messages.

Using the system of FIG. 1, the incoming mail 12 can be sent simultaneously via both of the two routines, mail routine 18 and internet routine 28. Via the internet routine 28 messages arrive to a destination point 26 faster than via the mail routine since e-mail is traveling much faster then paper mail. In some situations when a client needs to send a quick confirmation (e.g., of some contract) it can be sent via the internet routine 28. And simultaneously the original message is sent via the mail routine 18 since in some cases the confirmation is required to undergo some legal processing that can be done later but requires that the original paper mail letter be available.

FIG. 1 also illustrates how a internet e-mail 20 can be sent from an internet user 30 to non-internet user paper mail 25 via internet routine 28 and post office 24. If the internet mail 20 indicates that a destination user does not have e-mail address it sent to the post office 24 where it is printed on a paper and then sent as a letter to paper mail user 25.

In some cases when a user does have an e-mail address, nevertheless the user can send some parts of a message can be sent as paper mail and some parts can be sent as e-mail. For example, one can send a textual message from internet routine 28 to internet mail 27 and photos from internet routing to post office 24. This may be necessary for example, if a user does not have sufficient computer facilities to obtain high quality graphic photos. In such case high quality graphic picture portions from the message can be extracted in the post office 24 that has sufficient computer facilities for graphic reproduction.

FIG. 1 illustrates more details of the mail to internet feature of the present invention In FIG. 1 a sender 10 sends paper mail 12 with sender instructions 40 to post office 14.

At post office 14 an automatic process means 42 identifies whether the paper mail should be sent via surface mail routine or a e-mail via routine. Instructions on how to send a letter are left on the cover or envelope of the paper mail by the sender. An example of such information representation is given in FIG. 5. Automatic separating process means 42 uses a scanner to represent written or typed information digitally, and automatic handwriting or OCR devices are used to recognize this information. If the letter should be sent through the internet routine, then the automatic recognition of the internal address means 44 is used to scan and recognize the destination address. This address can be either the destination internet address or destination post address. The sender's e-mail database 46 is used to improve automatic address recognition. This procedure for improving automatic recognition of addresses is described in detail in FIG. 4. In the scanning and storing means 48 the content of the letter is scanned and stored digitally. Means 48 also records some sender mail characteristics (i.e., the handwriting manner of a written message, a description of a paper on which a letter was written, sender paper's characteristic smell etc.)

If the sender destination address is an internet address, the e-mail note 58 is received via internet routine from scanning and storing means 48 by a recipient 54. Otherwise, if the sender's destination address, is a post office address the e-mail note from is scanning and storing means 48 routed is through to reproduction facilities 56 that are local to the recipient. At the reproduction facilities 56 the e-mail content is reproduced as mail using user characteristics that were recorded in scanning and storing means 48. In particular, a handwriting synthezier device can reproduce a content of the message as a handwritten letter preserving the sender's manner to writing style. The type of paper that can be used to print a letter can be similar to a type of paper that was chosen by a sender. The detailed description of reproduction facilities and methods are given in FIG. 3. The reproduced letter can be transported to a recipient 54 via local means.

If at the point 42 it was identified that a letter should be sent as a surface mail then it's sent to automatic address recognition means 52 to automatically recognize a destination address. The automatic recognition of the destination address at means 52 is based on automatic handwriting recognition and (OCR) optical character recognition and uses user's mail database means 50 to improve the quality of recognition. This method is described in more details in FIG. 4. Finally a letter is sent to the recipient via usual transportation means.

The information about senders address and destination address and his instructions are recorded at user e-mail database 46 and user's mail database 50 (via connections between 44 and 46 and 50 and 52 respectively). In FIG. 1 these connection corresponds connection between 22 to 14 and 24 to 32.

Figure 3:
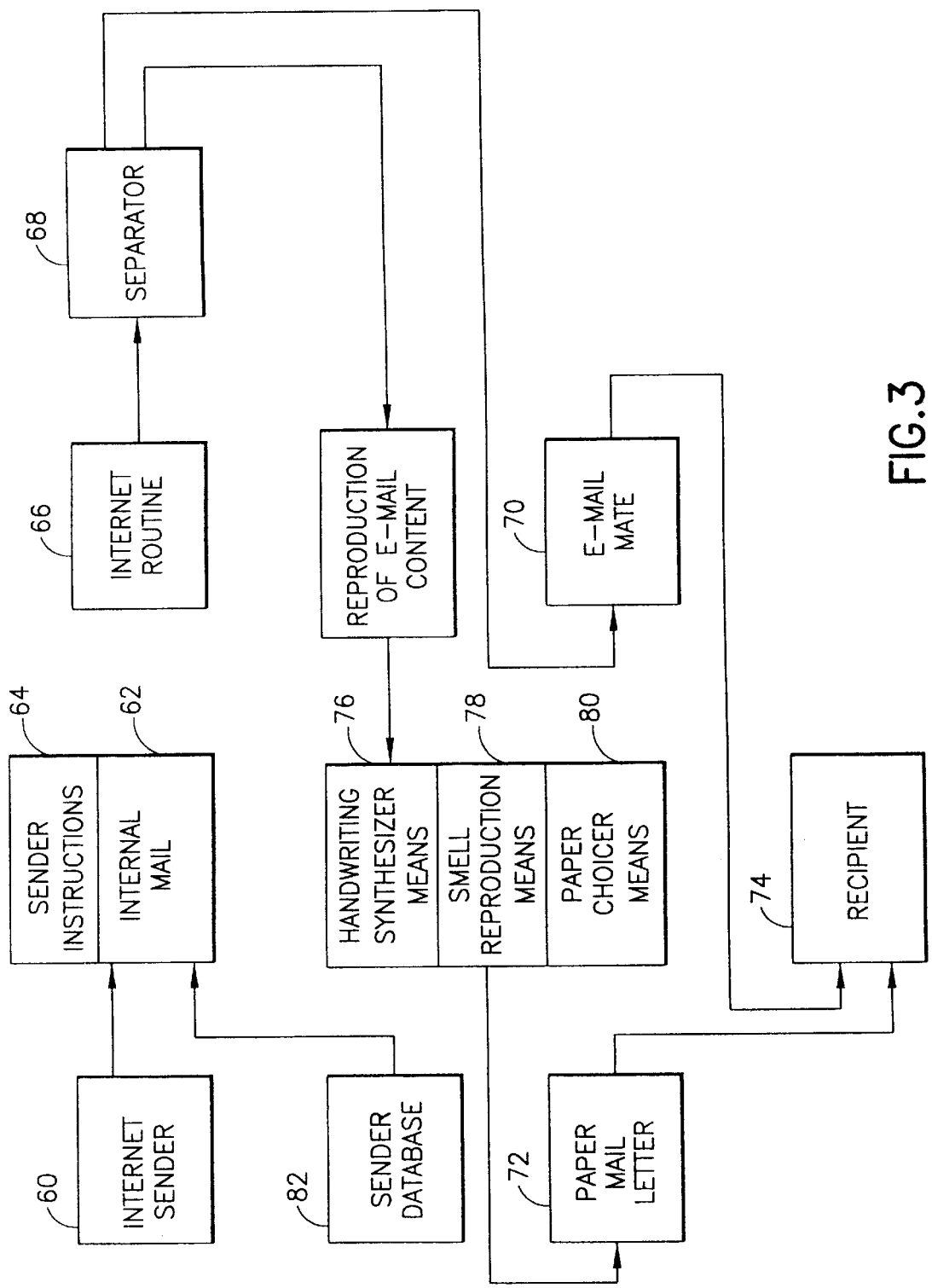
FIG. 3 is a schematic block diagram illustrating an embodiment of a system for communication from an internet user to a mail receiver.

FIG. 3 represent in more detail the internet message into mail feature.

Internet sender 60 sends an internet e-mail message 62 that contain sender's instructions 64 on how it should be processed. The e-mail passes through an internet routine 66 to a separator means 68. The separator means 68 reads instructions 64 and separates the messages that should be received as e-mail internet messages (70) from those that should be converted in paper mail (72) by the recipient 74. The reproduction facilities and functions consist of a handwriting synthesizer means 76, smell reproduction means 78 and paper choicer means 80. The handwriting synthesizer means 76 synthesize an e-mail message as a handwritten message. The sender database 82 contains information about a sender's handwriting manner (either a sample of his handwritten letters or formal description (protypes) of some sender's characteristics of his cursive writing; style, length, size of letters, etc). The smell reproduction means 78 attaches a specific smell to a letter paper (according to sender's instructions). The smell reproduction means 78 has access to a storage of chemicals that can be placed on a paper and reproduce a specific smell (e.g. roses, sea etc.) The paper choice means 80 chooses a paper format, facture etc. for a letter (also based on sender's instructions).

Figure 4:
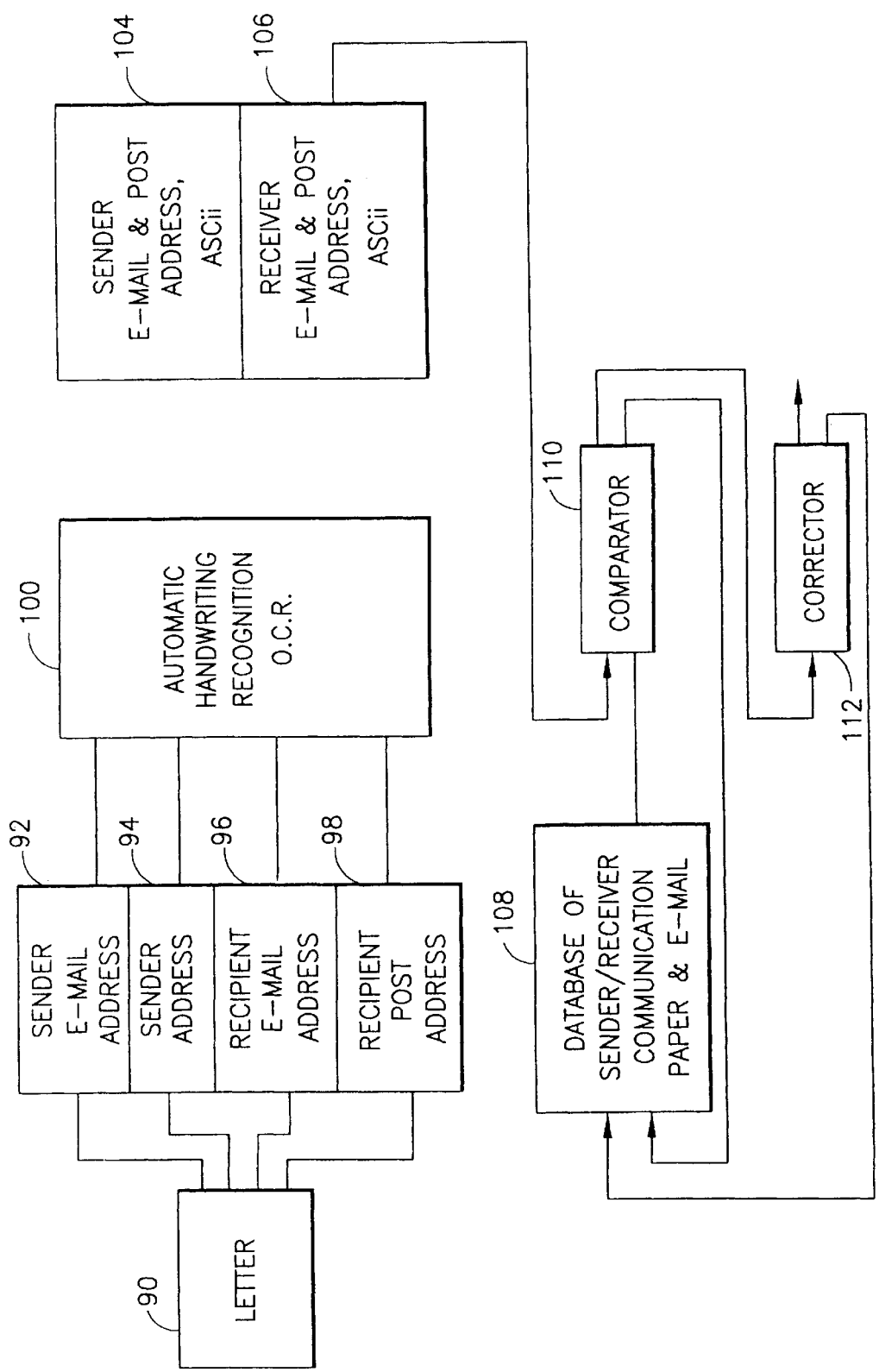
FIG. 4 is a schematic diagram of a flow chart that describes an improved automatic handwriting/text recognition that uses an internet database.

FIG. 4 describes in details how the handwriting/OCR means for processing addresses in FIG. 1 operates. A typical letter 90 contains the sender's and recipients e-mail and post address 92, 94, 96 and 98 respectively. An automatic handwriting/OCR means 100 decodes written or typed information from 92, 94, 96 and 98 and produces an ascii file at means 100. The database means 108 contains all addresses of senders and recipients that were recorded at a given time. Database 108 also indicates what addresses of senders/recipients were simultaneously on one envelope/letter. Since handwriting recognition module or OCR 100 can make mistakes in a few characters some technique is needed to correct a possible errors. The ascii files 104, 106 are sent to a comparator means 110 where it is determined whether similar information (representing one or all of items of the ascii files 104, 106 are stored in the database of sender/receive communication means 108. If it determines that some sender or receiver addresses match in most of characters to a decoded addresses from the files 104, 106 this information is sent to a corrector means 112. Corrector means 112 corrects the address from the 104 or 106 files. For example, a correct written e-mail address 92 is smith@nesctr.com and destination address 96 is Jones@westch.com If the e-mail addresses in 104 and 106 were decoded as smith@resctus.com and Jones@westu.com. If Smith sent messages to Jones in past, these addresses were recorded in the database 108 and related. This information can be used in corrector means 112 to correct the addresses in 104 and 106.

The corrected address is used to send a message to a recipient as described above. Also these corrected addresses are sent to database 108 to record the history of the relationship between Smith and Jones for future references.

FIG. 5 is a table that illustrates an example of a representation of a sender's instruction and information on an envelope of a letter. In FIG. 5, lines 126 and 127 are the sender's internet and post addresses. Lines 123 and 124 are the destination internet and post address. Lines 121 and 122 are the send via internet or via surface mail instructions. In FIG. 5 both answers are shown as "yes", i.e., a letter should be sent via both ways—internet and post mail). Line 125 indicates permission to open an envelop to scan a letter.

Variations of the embodiment shown in FIGS. 1–4 are possible within the scope of the invention. In addition to the format for the transmission on the envelope, it is also possible to have a format for e-mails that would be transmitted from an e-mail to somebody who does not have e-mail or internet access. A technique can be included to provide a way for a sender to send an e-mail to a recipient without e-mail address based on the address of the person. In such case, obviously, the sender must send the e-mail to a server and the server must be able to automatically convert country zip code and city into the e-mail address of the closest post office. There is no way to expect that the sender will have that information. The local post office should now be able to read the rest of the header to check if the corresponding address is associated to a registered e-mail, in which case the mail is forwarded, or not, in which case it is printed and mailed. (of course, the sender can also request that it be printed). When sending a mail to be sent by the post office via e-mail to a recipient, it is also important to have the appropriate return address. In other words, the recipient must know that to reply via e-mail he must use the originating post office e-mail address and the appropriate header. "When the sender register his e-mail address to the local post office that you will specify if you want pictures printed etc." Also for personal security reasons a sender should be able to protect email notes from being read at the post office. Only header (address and instruction) information could be accessible at a post office and all private information (below header) should be encrypted when it reached a post office. This information can be automatically decrypted when it will be sent from the office to a destination person.

It is also important to add a billing procedure. Different billing procedure solutions presently exist 1) to send e-mails you would have to enroll and pay a monthly fee, independent of your mailing, or pay per mail send (or kB sent) or fixed price for a given amount then on a mail by mail basis. 2) reception is free. Special order (color pictures etc. may be paid either by the sender or receiver).

It is important that the system handle pictures and OCR letters. In addition, it may be desirable to be able to take a snapshot of pages (fax) and this should be an option too. Other features that may be included in an embodiment are the capability to track the mail and the possibility to have notification of receipt and authentication of sender/receiver (including, "has it been delivered," "has it been read"). A feature for downloading registered documents via a secure web server (or notes server) or from a mail server with a special password). A password to send authenticated mail may also be included in the embodiment A feature may also be provided where means to inform the post office when there are pictures and documents, how to indicate what documents to print at the post office, what to e-mail. Or what to print as regular text and what to print as high quality pictures. This can be done with special attachment to envelope or an electronic form to e-mail note on which additional user instructions can be written. Also a post office can store informations from receivers on their preferences and what computer facilities are available at their home/office. Concerning reproduction facilities known technology can be used. Such facilities will be able to print texts in required fonts or cursive handwriting. Regarding handwriting synthesis, known technology can also be used. It can be done, for example, using such things like a table that maps ASCII letters to handwriting cursive, letters of some person. Then any ASCII message of this person can be substitutes with handwriting letters (from this particular table). Letters should be connected to each to make a cursive written string. This connection of letters can be done with help of interconnection table that shows how different cursive alphabetic symbols are connected.

While preferred embodiments of the invention have been disclosed in detail, it should be understood by those skilled in the art that various other modifications may be made to the illustrated embodiments without departing from the scope and spirit of the invention as described in the specification and defined in the appended claims.

What is claimed is:

1. A communication method including an integrated solution, architecture, service and addressing technique for transmitting and receiving combinations of paper mail and electronic mail wherein a postal address is universally mapped to an electronic mail address comprising the steps of: receiving a particular given item of paper mail from a first sender at a first post office facility wherein the particular given item of paper mail includes, incorporated in the paper mail, all the addressee information and instructions from said first sender to transmit the entire particular given item of paper mail to the addressee by post mail, by electronic e-mail, by selected first portions of the particular given item of paper mail by post mail and second selected portions of the same particular item of paper mail by e-mail;

receiving electronic mail from a second sender via an internet channel and paper mail from the second sender via post mail;

converting the electronic mail received from the second sender via the internet channel to paper mail at the first post office facility;

delivering the electronic mail received from the second sender and converted to paper mail and the paper mail received from the second sender via post mail to an addressee via surface paper mail routines.

2. A method according to claim 1 wherein the particular given item of paper mail received from the first sender includes, incorporated therein, instructions specifying the first portion of the paper mail to be transmitted by post mail and the second portions of the paper mail to be transmitted by e-mail, and the type of paper size, fonts, and paper format to be used when converting the second e-mail portions to paper mail.

3. A method according to claim 1 wherein the received paper mail from the first sender is addressed in the form of printed text and handwriting, and wherein the paper mail is converted to electronic mail by scanning the paper mail with an optical character recognition system wherein the recognition system includes a data base containing the stored addresses of both the senders and the addressees of mail as post addresses and internet addresses and then comparing the addressee of the paper mail with the addresses of the senders and the addressees in the database and wherein the database also contains examples of sender handwriting styles and wherein the method further includes providing a smell reproduction means for storing chemicals having selected aromas and applying a selected aroma to the paper mail.

4. A method according to claim 1 further including the step wherein the first sender encrypts the paper mail before the paper mail is received at the post office facility such that only the addressee and instructions portion of the paper mail is not encrypted.

5. A communication method according to claim 1 for transmitting paper mail from a sender and converting it to electronic mail for delivery to a recipient comprising the steps of:

receiving paper mail from a sender via surface mail at a local post office wherein the paper mail includes a text portion and a graphic portion, providing instructions in the paper mail to the first post office facility to send a first text portion and graphic portion via e-mail and a second text portion and graphic portion via post mail, scanning the received paper mail, and converting the first text and graphic portions of the paper mail into electronic mail and sending the electronic mail to an addressee via an electronic e-mail machine means and sending the second text and graphic portion via post mail.

* * * * *